US007117851B2

(12) United States Patent
Tomita

(10) Patent No.: US 7,117,851 B2
(45) Date of Patent: Oct. 10, 2006

(54) INSTALLATION PROCEDURE AND CORRECTION JIG FOR A COMBUSTION GAS SEAL FOR AN INJECTOR

(75) Inventor: Yukiharu Tomita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 150 days.

(21) Appl. No.: 10/993,435

(22) Filed: Nov. 22, 2004

(65) Prior Publication Data

US 2005/0109325 A1 May 26, 2005

(30) Foreign Application Priority Data

Nov. 25, 2003 (JP) ............................ 2003-394405
Nov. 28, 2003 (JP) ............................ 2003-400365

(51) Int. Cl.
*F02M 61/14* (2006.01)
*B23P 19/02* (2006.01)

(52) U.S. Cl. ........................................ 123/470; 29/235

(58) Field of Classification Search ................ 123/470; 29/235

See application file for complete search history.

(56) References Cited

U.S. PATENT DOCUMENTS

| | | | | |
|---|---|---|---|---|
| 3,319,325 | A * | 5/1967 | Nessamar et al. | 29/235 |
| 3,604,096 | A * | 9/1971 | Shiroma | 29/235 |
| 3,686,741 | A * | 8/1972 | Williams et al. | 29/450 |
| 3,777,358 | A * | 12/1973 | Matievich et al. | 29/450 |
| 3,981,065 | A * | 9/1976 | Gaines et al. | 29/450 |
| 4,291,451 | A * | 9/1981 | O'Neill et al. | 29/235 |
| 4,843,668 | A * | 7/1989 | Bondar | 7/164 |
| 5,062,194 | A * | 11/1991 | Mercurio et al. | 29/451 |
| 5,584,110 | A * | 12/1996 | Mordoch | 29/229 |
| 6,349,459 | B1 * | 2/2002 | Dean | 29/235 |
| 6,748,640 | B1 * | 6/2004 | Ino | 29/451 |
| 7,047,618 | B1 * | 5/2006 | Hunter | 29/450 |
| 7,047,619 | B1 * | 5/2006 | Wambold et al. | 29/451 |

FOREIGN PATENT DOCUMENTS

| | | |
|---|---|---|
| JP | 11-294302 | 10/1999 |
| JP | 2002-364494 | 12/2002 |
| JP | 2005-163561 | 6/2005 |

* cited by examiner

*Primary Examiner*—Thomas Moulis
(74) *Attorney, Agent, or Firm*—Kenyon & Kenyon LLP

(57) ABSTRACT

A correction jig is used when installing a resin combustion gas seal in an annular installation groove of a nozzle portion of an injector. The installation groove has an increased diameter portion in a section closer to a body of the injector. When the nozzle portion is caused to pass through the combustion gas seal from a distal end of the nozzle portion to arrange the combustion gas seal at the installation groove, the correction jig receives the combustion gas seal so that the combustion gas seal is prevented from interfering with the increased diameter portion. Thereafter, the correction jig is moved relative to the injector to correct an outer diameter of the combustion gas seal. As a result, the combustion gas seal is optimally installed in the installation groove.

19 Claims, 12 Drawing Sheets

INSTALLATION PROCEDURE AND CORRECTION JIG FOR A COMBUSTION GAS SEAL FOR AN INJECTOR

BACKGROUND OF THE INVENTION

The present invention relates to combustion gas seals for injectors.

As an example, Japanese Laid-Open Patent Publication No. 2002-364494 describes a conventional installation procedure for a combustion gas seal for injectors. More specifically, the publication discloses an installation procedure for a resin combustion gas seal for an injector and a correction jig used for the gas seal. The gas seal is installed in an annular installation groove defined in a nozzle portion of the injector for sealing an annular space defined between the injector and a recess in which the injector is installed. When fitted into the installation groove, the gas seal is temporarily radially expanded such that the outer diameter of the gas seal is increased. The correction jig is used for correcting the outer diameter of the gas seal. The procedure in the aforementioned publication includes the following steps.

Step A: A cylindrical correction jig is attached to a portion of the injector closer to the injector body than the installation groove of the injector.

Step B: A combustion gas seal is fitted into the installation groove.

Step C: The correction jig is moved toward the nozzle distal end and relative to the injector. The outer circumferential surface of the gas seal is thus pressed by the inner circumferential surface of the correction jig. Accordingly, the correction jig corrects the increased outer diameter of the deformed gas seal.

However, with reference to FIG. 21, if the fitting step is performed from the side corresponding to the nozzle distal end, the gas seal 100 may be interfered with a slanted surface 102, which is formed in a portion of the installation groove of the injector with a diameter that gradually increases toward the injector body.

As has been described, the gas seal is radially expanded when fitted into the installation groove. Once reaching the installation groove, the gas seal starts to restore to the original shape, or the original diameter, by its elastic shape-restoring force. However, such restoration is hampered by the interference between the gas seal and the slanted surface, such that the gas seal is shaped in correspondence with the shape of the slanted surface. The shape of the gas seal thus may be varied among different products prior to the correction with the correction jig, and correction accuracy is lowered.

The same disadvantage is presented in the installation of the gas seal in an installation groove having a non-uniform diameter.

Further, in order to improve the sealing performance of the injector, the injector may include two gas seals installed in respective annular installation grooves, as described in Japanese Laid-Open Patent Publication No. 11-294302. The grooves are defined in the nozzle portion of the injector as spaced from each other at an appropriate interval. If the aforementioned procedure of the publication No. 2002-364494 is employed for installation of such gas seals, the steps A to C must be repeated, which complicates the procedure.

SUMMARY OF THE INVENTION

Accordingly, it is an objective of the present invention to provide an installation procedure for a combustion gas seal for an injector capable of optimally installing the gas seal in an installation groove regardless of the shape of the groove and a correction jig for advantageous use in the installation.

To achieve the foregoing and other objectives and in accordance with the purpose of the present invention, a method for installing a resin combustion gas seal to an injector fitted to an installation recess is provided. The injector has a body and a nozzle portion extend from the body. The nozzle portion has an annular installation groove in which the combustion gas seal is installed. The installation groove has an increased diameter portion in a section closer to the body. The combustion gas seal seals an annular space defined between the nozzle portion and an inner surface of the installation recess. The method includes: a first step wherein, with the combustion gas seal being prevented from interfering with the increased diameter portion, the nozzle portion is caused to pass through the combustion gas seal from a distal end of the nozzle portion, thereby arranging the combustion gas seal at the installation groove; and a second step wherein, after arranging the combustion gas seal at the installation groove, relative movement is produced between the injector and a correction jig such that the correction jig approaches the distal end of the nozzle portion from a side of the body, thereby correcting an outer diameter of the combustion gas seal.

The present invention provides another method for installing first and second resin combustion gas seals to an injector fitted to an installation recess. The injector has a body and a nozzle portion extending from the body. The nozzle portion has first and second annular installation grooves in which the first and second combustion gas seals are installed, respectively. The second installation groove is closer to the distal end of the nozzle portion than the first installation groove. The first and second combustion gas seals seal an annular space defined between the nozzle portion and an inner surface of the installation recess. The method includes: a first step wherein the nozzle portion is caused to pass through the first combustion gas seal from a distal end of the nozzle portion, thereby arranging the first combustion gas seal at the first installation groove; a second step wherein, after arranging the first combustion gas seal at the first installation groove, relative movement is produced between the injector and a correction jig such that the correction jig approaches the distal end of the nozzle portion from a side of the body, thereby correcting an outer diameter of the first combustion gas seal; a third step performed in the second step, wherein, in the third step, the nozzle portion is caused to pass through the second combustion gas seal from the distal end, thereby arranging the second combustion gas seal at the second installation groove, and the second combustion gas seal is positioned with respect to the second installation groove with the correction jig; and a fourth step wherein, after arranging the second combustion gas seal at the second installation groove, the relative movement of the injector and the correction jig is further produced such that the correction jig approaches the distal end of the nozzle portion, thereby correcting the outer diameter of the second combustion gas seal.

The present invention also provides a correction jig used when installing a resin combustion gas seal to an injector fitted to an installation recess. The injector has a body and a nozzle portion extending from the body. The nozzle portion has an annular installation groove in which the combustion gas seal is installed. The installation groove has an increased diameter portion in a section closer to the body. The combustion gas seal seals an annular space defined between the nozzle portion and an inner surface of the installation recess. The correction jig includes a cylindrical surface, a support portion, and a receiving portion. The cylindrical surface defines an insertion hole into which the injector is inserted. When relative movement is produced between the injector and the correction jig such that the combustion gas seal arranged at the installation groove passes by the cylindrical surface, the cylindrical surface corrects the outer diameter of the combustion gas seal, which has been radially expanded when the combustion gas seal is installed in the installation groove. In a state where the injector is inserted into the insertion hole, the support portion contacts the injector to determine a position of the correction jig along an axial direction relative to the injector. When the nozzle portion is caused to pass through the combustion gas seal from a distal end of the nozzle portion to arrange the combustion gas seal at the installation groove, the receiving portion receives the combustion gas seal. The length from the support portion to the receiving portion is determined such that, in a state where the support portion contacts the injector, the receiving portion is closer to the distal end of the nozzle portion than the increased diameter portion.

The present invention provides another correction jig used when installing a first and second resin combustion gas seals to an injector fitted to an installation recess. The injector has a body and a nozzle portion extending from the body. The nozzle portion has first and second annular installation grooves in which the first and second combustion gas seals are installed, respectively. The second installation groove is closer to the distal end of the nozzle portion than the first installation groove. The first and second combustion gas seals seal an annular space defined between the nozzle portion and an inner surface of the installation recess. The correction jig includes a cylindrical surface and a receiving portion. The cylindrical surface defines an insertion hole into which the injector is inserted. When relative movement is produced between the injector and the correction jig such that each combustion gas seal arranged at the corresponding installation groove passes by the cylindrical surface, the cylindrical surface corrects the outer diameter of each combustion gas seal, which has been radially expanded when the combustion gas seal is installed in the corresponding installation groove. When the nozzle portion is caused to pass through the second combustion gas seal from a distal end of the nozzle portion to arrange the second combustion gas seal at the second installation groove, the receiving portion receives the second combustion gas seal, and wherein the cylindrical surface and the receiving portion are formed such that, when the cylindrical surface is correcting the outer diameter of the first combustion gas seal, the receiving portion receives the second combustion gas seal at a position corresponding to the second installation groove.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of an installation procedure and a correction jig for a combustion gas seal for an injector according to the present invention will now be described.

The installation procedure and the correction jig for the first embodiment are applied to an injector 10. The injector 10 will first be explained.

Figure 1:
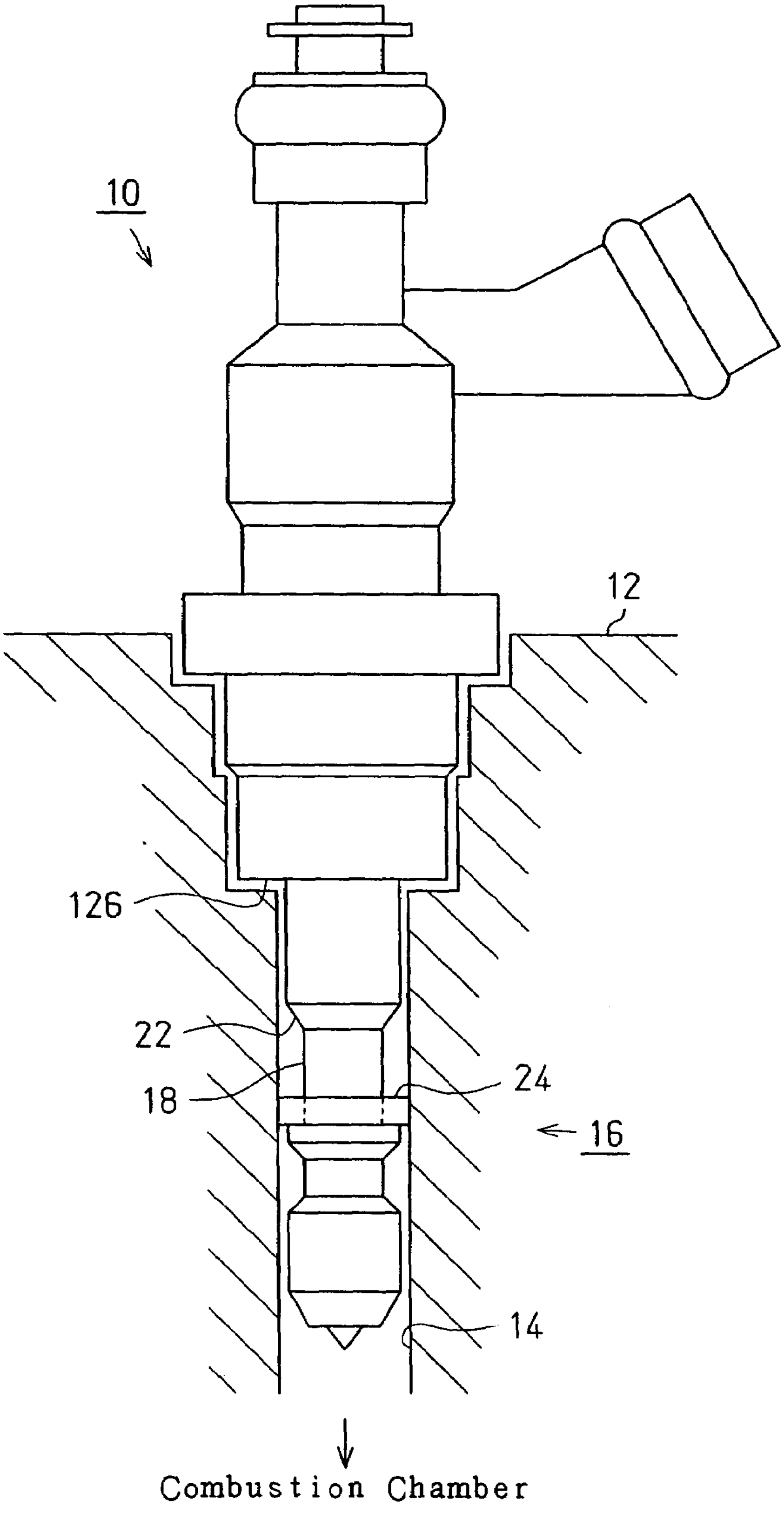
FIG. 1 is a partial cross-sectional view showing an injector and the vicinity thereof to which an installation procedure and a correction tool for a combustion gas seal according to a first embodiment of the present invention is applied.

FIG. 1 shows the injector 10 and the vicinity of the injector 10.

As illustrated in the drawing, the injector 10 is fitted to an injector installation recess 14 defined in an engine 12. The injector 10 includes a nozzle portion 16 and an annular installation groove 18. The installation groove 18 is defined in the nozzle portion 16 and extends along the entire circumference of the nozzle portion 16. A slanted surface 22 is formed in a portion of the installation groove 18 at a position close to a body of the injector 10 (as viewed in an upper portion of FIG. 1). The diameter of the slanted surface 22 gradually increases toward the body of the injector 10. Also, a stepped portion 126 is formed in a portion of the injector 10 closer to the injector body than the installation groove 18. In correspondence with the stepped portion 126, the outer diameter of the injector 10 is increased in a step-wise manner.

An annular combustion gas seal 24 is installed in the installation groove 18 of the injector 10. The gas seal 24 seals an annular space defined between the injector installation recess 14 and the nozzle portion 16. The gas in the combustion chamber is thus prevented from leaking through the space. The gas seal 24 is formed of, for example, a type of fluorine-containing resin, such as polytetrafluoroethylene (PTFE), PTFE containing fillers such as glass, and estramer.

In FIG. 1, the recessed amount of the installation groove 18 and the thickness of the gas seal 24 with respect to the radial direction are exaggerated for illustration purposes.

A procedure for installation of the gas seal 24 in the injector 10 is as follows.

Figure 2:
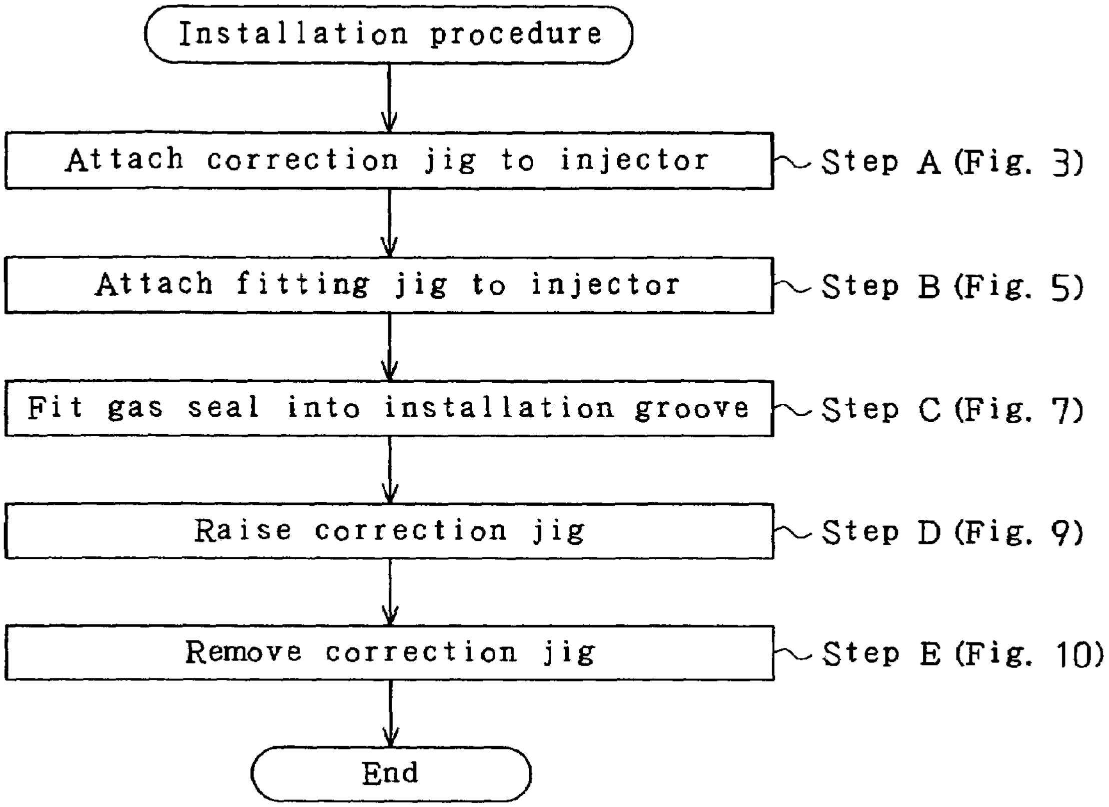
FIG. 2 is a flowchart illustrating the installation procedure for the gas seal of the first embodiment.

The procedure is performed in accordance with steps A to E of FIG. 2, with respect to the injector 10 supported such that the nozzle portion 12 faces upward.

With reference to FIGS. 3 to 10, steps A to E will be described in detail. Also in the drawings, like FIG. 1, the recessed amount of the installation groove 18 and the thickness of the gas seal 24 with respect to the radial direction are exaggerated for illustration purposes. Further, the shapes of the correction, fitting, and pressing jigs are illustrated in a similar manner.

Figure 3:
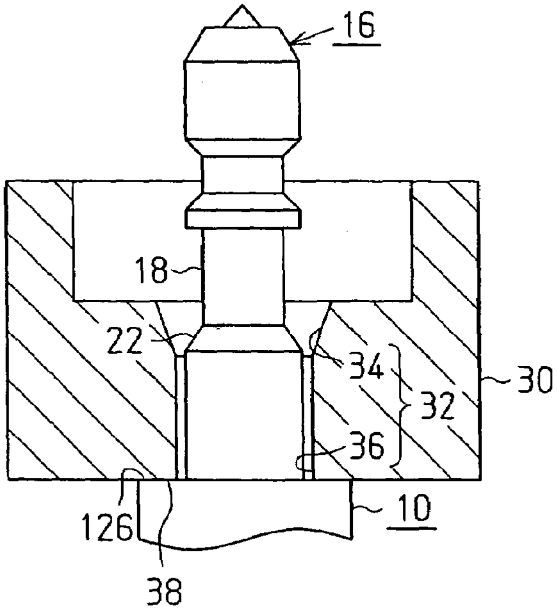
FIG. 3 is a partial cross-sectional view corresponding to an installation step for the gas seal of the first embodiment.
Figure 4:
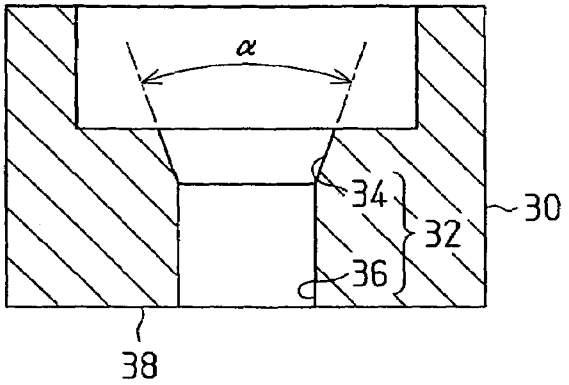
FIG. 4 is a cross-sectional view showing a side of the correction jig of the first embodiment.

<Step A: FIG. 3>

First, referring to FIG. 3, a correction jig 30 is attached to the injector 10.

The correction jig 30 has an axial through hole having a circular cross-sectional shape. By inserting the nozzle portion 16 of the injector 10 into the through hole of the correction jig 30, the correction jig 30 is attached to the injector 10. More specifically, the nozzle portion 16 of the injector 10 is fitted to the through hole of the correction jig 30 such that the lower side of the correction jig 30 contacts the stepped portion 126 of the injector 10. At this stage, a correction portion of the correction jig 30 is located closer to the body of the injector 10 than the installation groove 18.

The gas seal 24 is radially expanded when fitted to the installation groove 18. The correction jig 30 receives the gas seal 24 in this state. Subsequently, the correction jig 30 is moved relative to the injector 10, such that the correction jig 30 corrects the increased outer diameter of the gas seal 24. In other words, with reference to FIG. 4, which shows the correction jig 30 separately, a tapered surface 34 is formed in a portion of an inner circumferential surface 32 of the through hole of the correction jig 30 at the side corresponding to the nozzle distal end. The diameter of the tapered surface 34(a receiving portion) gradually increases toward the nozzle distal end. In the illustrated embodiment, the taper angle a of the tapered surface 34 is set to 10 degrees. In contrast, a portion of the inner circumferential surface 32 of the through hole of the correction jig 30 at the side corresponding to the body of the injector 10 is formed by a cylindrical surface 36 having a uniform diameter.

Figure 5:
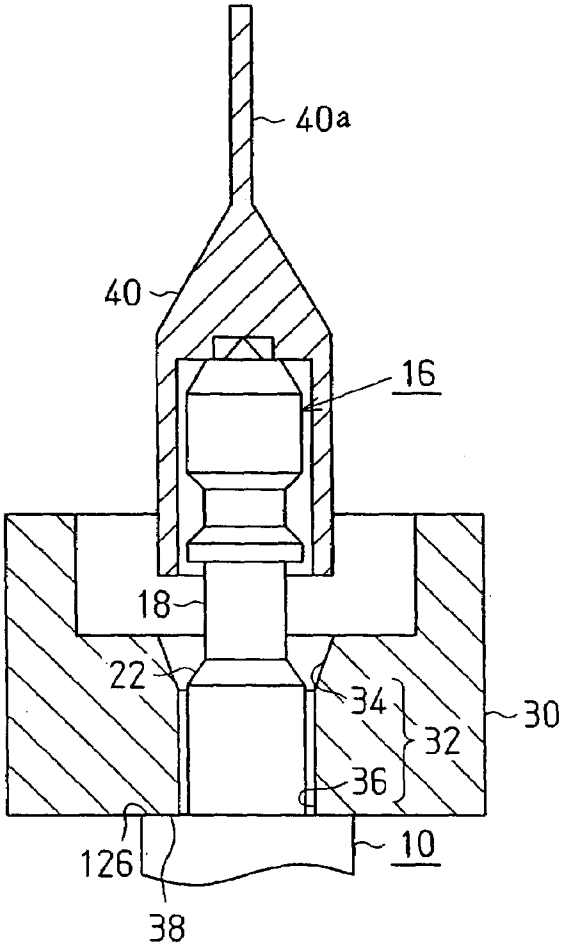
FIG. 5 is a partial cross-sectional view showing an installation step for the gas seal of the first embodiment.

<Step B: FIG. 5>

As illustrated in FIG. 5, a fitting jig 40 is attached to the injector 10.

Figure 6:
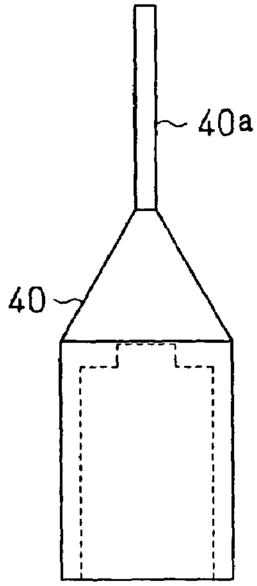
FIG. 6 is a side view showing a fitting jig for the first embodiment.

With the fitting jig 40, the gas seal 24 is fitted to the installation groove 18. Referring to FIG. 6, the fitting jig 40 includes an upper portion having a cone-like shape and a lower portion having a cylindrical shape. When the fitting jig 40 is fitted to the nozzle distal end of the injector 10 (as indicated in FIG. 5), the fitting jig 40 encompasses the portion of the injector 10 from the nozzle distal end to the installing groove 18.

Figure 7:
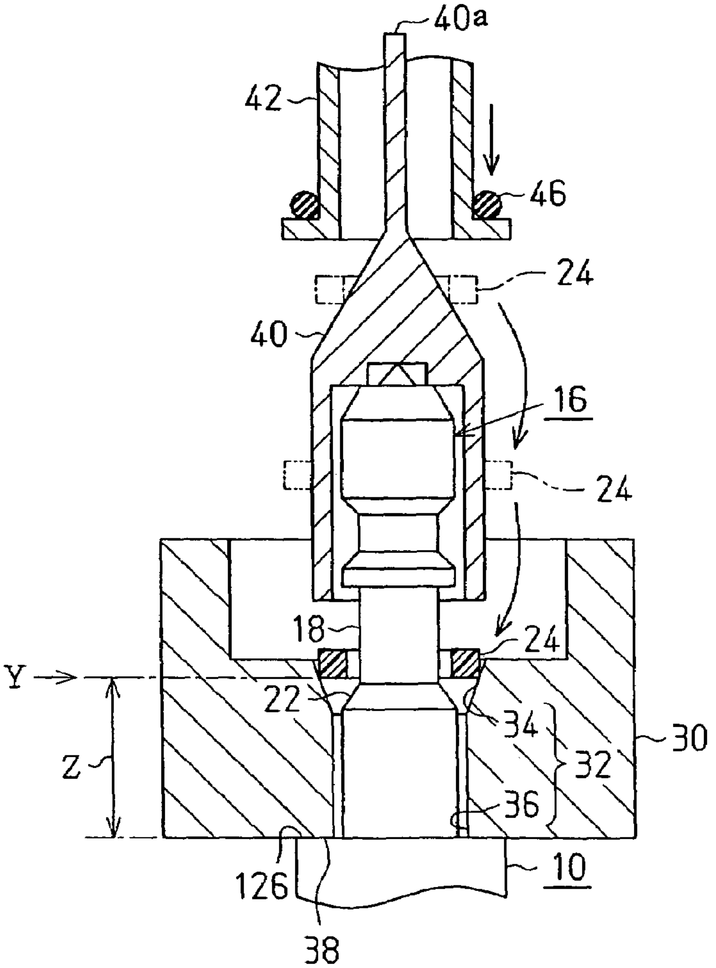
FIG. 7 is a partial cross-sectional view corresponding to an installation step for the gas seal of the first embodiment.

<Step C: FIG. 7>

The gas seal 24 is fitted to the installation groove 18.

More specifically, with reference to FIG. 7, the gas seal 24 is first placed at an upper portion of the fitting jig 40. The gas seal 24 is then pressed downward as radially expanded using a pressing jig 42, such that the gas seal 24 is fitted to the installation groove 18.

Figure 8:
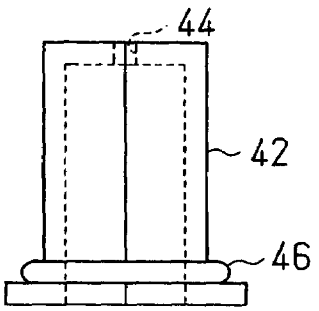
FIGS. 8(*a*) and 8(*b*) are side views showing a side of a pressing jig of the first embodiment.
Figure 8:
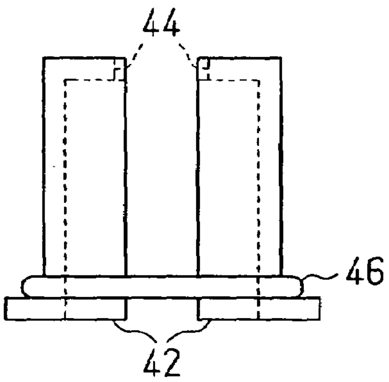

As illustrated in FIGS. 8(*a*) and 8(*b*), the pressing jig 42 includes two divided sections each having a substantially semi-cylindrical shape. At the initial stage, the divided sections are combined with each other in a lidded cylindrical shape, with reference to FIG. 8(*a*). The divided sections are thus abutted by each other by means of an elastic member 46 formed of, for example, synthetic rubber. When the pressing jig 42 presses the gas seal 24 downward, force is applied to the inner side of the pressing jig 42. The elastic member 46 is thus elastically deformed such that the divided sections are separated from each other, as shown in FIG. 8(*b*).

A guide hole 44 is defined in an upper portion of the pressing jig 42. When the pressing jig 42 is attached to the fitting jig 40 or the gas seal 24 is pressed downward by the pressing jig 42, a guide bar 40*a* (FIG. 6) projecting from an upper portion of the fitting jig 40 is inserted in the guide hole 44. This guides the pressing jig 42 along the axial direction of the injector 10.

Afterwards, the gas seal 24 falls downward while restoring to its original shape due to its elastic shape-restoring force. The gas seal 24 is then received by the tapered surface 34 of the correction jig 30 as shown in FIG. 7. In the illustrated embodiment, an interval Z between a support portion 38 of the correction jig 30 with respect to the injector 10 and a portion Y receiving the gas seal 24 is set such that the portion Y is located closer to the nozzle distal end than the slanted surface 22 of the injector 10, when the lower side of the correction jig 30 is abutted by the stepped portion 126 of the injector 10. This structure prevents the gas seal 24 from being interfered with (caught by) the slanted surface 22 of the injector 10. In the illustrated embodiment, step C corresponds to a first step wherein, with the combustion gas seal 24 being prevented from interfering with the increased diameter portion, the nozzle portion 16 is caused to pass through the combustion gas seal 24 from a distal end of the nozzle portion, thereby arranging the combustion gas seal 24 at the installation groove 18

Figure 9:
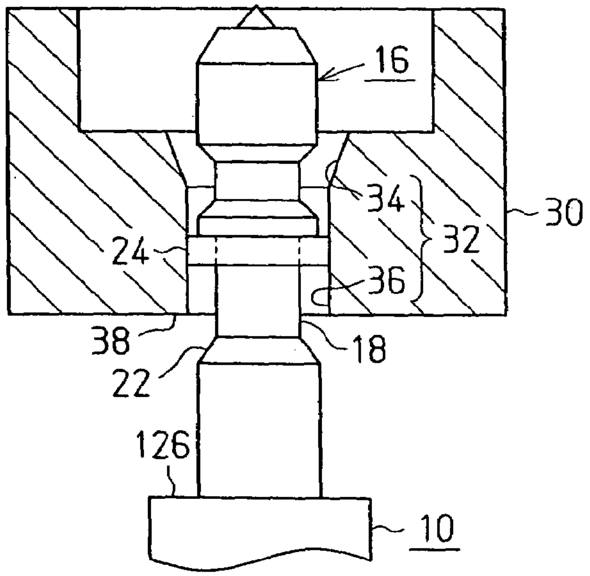
FIG. 9 is a partial cross-sectional view corresponding to an installation step of the gas seal of the first embodiment.

<Step D: FIG. 9>

The correction jig 30 is raised.

At this stage, the gas seal 24 is guided to the position indicated in FIG. 9 by means of the tapered surface 34 and the cylindrical surface 36 of the correction jig 30. Meanwhile, the gas seal 24 is pressed against the wall of the installation groove 18 by the cylindrical surface 36, such that the increased outer diameter of the gas seal 24 is corrected. In the illustrated embodiment, step D corresponds to a second step wherein, after arranging the combustion gas seal 24 at the installation groove 18, relative movement is produced between the injector 10 and a correction jig 30 such that the correction jig 30 approaches the distal end of the nozzle portion 16 from a side of the body, thereby correcting an outer diameter of the combustion gas seal 24.

In order to improve the correction accuracy of the outer diameter of the gas seal 24, it is desired that the fitting of the gas seal 24 into the installation groove 18 be performed such that the increased amount of the outer diameter of the gas seal 24 is minimized. As one solution, the wall thickness of the fitting jig 40 may be reduced. This minimizes the deformation amount of the gas seal 24 when the fitting of the gas seal 24 is performed. The outer diameter of the gas seal 24 thus remains relatively small when fitted to the installation groove 18, prior to correction. However, in order to ensure the durability of the fitting jig 40, it is necessary to maintain the wall thickness of the fitting jig 40 at a certain level. As an alternative solution, the gas seal 24 may be moved to the installation groove 18 at a relatively high speed when fitting the gas seal 24 to the installation groove 18. This shortens the time in which the gas seal 24 remains in a deformed state, thus suppressing the increase of the outer diameter of the gas seal 24, prior to the correction. In this regard, the inventors have conducted various tests, and the following has been made clear. That is, as long as the movement speed of the gas seal 24 in the fitting step is set to 90 mm/s or higher, the increase amount of the outer diameter of the gas seal 24 prior to correction can be contained in a correctable range, even if the wall thickness of the fitting jig 40 is maintained relatively large for ensuring sufficient durability of the fitting jig 40.

In the illustrated embodiment, the movement speed of the gas seal 24 is set to 100 mm/s. The wall thickness of the fitting jig 40 thus becomes sufficiently large, while the outer diameter of the gas seal 24 prior to the correction is prevented from increasing excessively.

In order to accurately correct the outer diameter of the gas seal 24, it is advantageous that the center of the gas seal 24, which has an annular shape, corresponds to the axis of the injector 10. For this purpose, the taper angle a of the tapered surface 34 of the correction jig 30 (see FIG. 4) must be relatively large. However, if the taper angle a is relatively large, the correction amount for the tapered surface 34 becomes relatively large. This may cause undesired deformation of the gas seal 24, thus making it impossible to appropriately conduct the correction of the outer diameter of the gas seal 24. In this regard, the inventors have carried out various tests, and the following has been determined. That is, by setting the taper angle $\alpha$ to not less than 10 degrees but not more than 20 degrees, or, more preferably, to 10 degrees, lowering of position accuracy of the gas seal 24 and undesired deformation of the gas seal 24 are advantageously suppressed.

Figure 10:
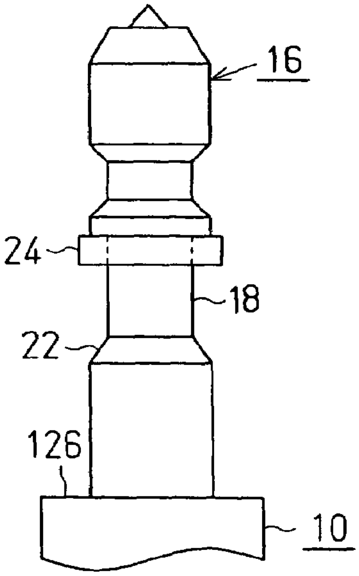
FIG. 10 is a side view showing the structure of the injector in which the gas seal is installed in accordance with the first embodiment.

<Step E: FIG. 10>

The correction jig 30 is further raised and removed from the injector 10. As a result, the installation of the gas seal 24 in the installation groove 18 is completed, as illustrated in FIG. 10.

The first embodiment has the following advantages.

(1) The gas seal 24 is fitted to the installation groove 18 while being prevented from being interfered with the slanted surface 22, which is formed in the installation groove 18 of the injector 10. Therefore, even if the injector 10 is supported such that the nozzle portion 16 faces upward, the interference between the gas seal 24 and the slanted surface 22 of the installation groove 18 is reliably avoided. This advantageously suppresses shape variation of the gas seal 24 among different products prior to correction by the correction jig 30. As a result, the correction accuracy of the correction jig 30 is prevented from being lowered, and the installation of the gas seal 24 in the installation groove 18 is optimally completed.

(2) Before the gas seal 24 is fitted to the installation groove 18, the correction jig 30 is attached to the injector 10. At this stage, the correcting portion of the correction jig 30 is located closer to the body of the injector 10 than the installation groove 18. When the gas seal 24 reaches the installation groove 18, the correction jig 30 receives the gas seal 24 such that the gas seal 24 is not interfered with the slanted surface 22 of the installation groove 18. Accordingly, the gas seal 24 is prevented from being interfered with the slanted surface 22 efficiently by the correction jig 30. This also prevents the configuration of the installation apparatus of the gas seal 24 from becoming complicated.

(3) The gas seal 24 is moved to the installation groove 18 by the fitting jig 40, which is attached to the nozzle portion 16 of the injector 10, at a speed equal to or faster than 90 mm/s. Therefore, while the wall thickness of the fitting jig 40 is maintained sufficiently large, or the durability of the fitting jig 40 is sufficiently ensured, the outer diameter of the gas seal 24 is prevented from being excessively increased prior to correction. As a result, the correction of the outer diameter of the gas seal 24 is appropriately conducted.

(4) The interval Z between the support portion 38 of the correction jig 30 with respect to the injector 10 and the portion Y receiving the gas seal 24 in the installation groove 18 (see FIG. 7) is set such that the portion Y is located closer to the nozzle distal end than the slanted surface 22 of the injector 10, when the lower side of the correction jig 30 is abutted by the stepped portion 126 of the injector 10. This structure prevents the gas seal 24 from being interfered with the slanted surface 22.

(5) The tapered surface 34 is formed in the portion Y (FIG. 7), which receives the gas seal 24, for guiding the gas seal 24 toward the distal end of the injector 10. This structure allows the gas seal 24 to be moved quickly toward the nozzle distal end while correcting the outer diameter of the gas seal 24, after the gas seal 24 is received by the tapered surface 34.

(6) The taper angle $\alpha$ of the tapered surface 34 of the correction jig 30 is set to 10 degrees. The correction of the outer diameter of the gas seal 24 is conducted further appropriately.

Next, a second embodiment of the installation procedure and the correction jig for the gas seal for the injector according to the present invention will be described. The description will focus on the differences between the first embodiment, which is illustrated in FIGS. 1 to 10, and the second embodiment.

Figure 11:
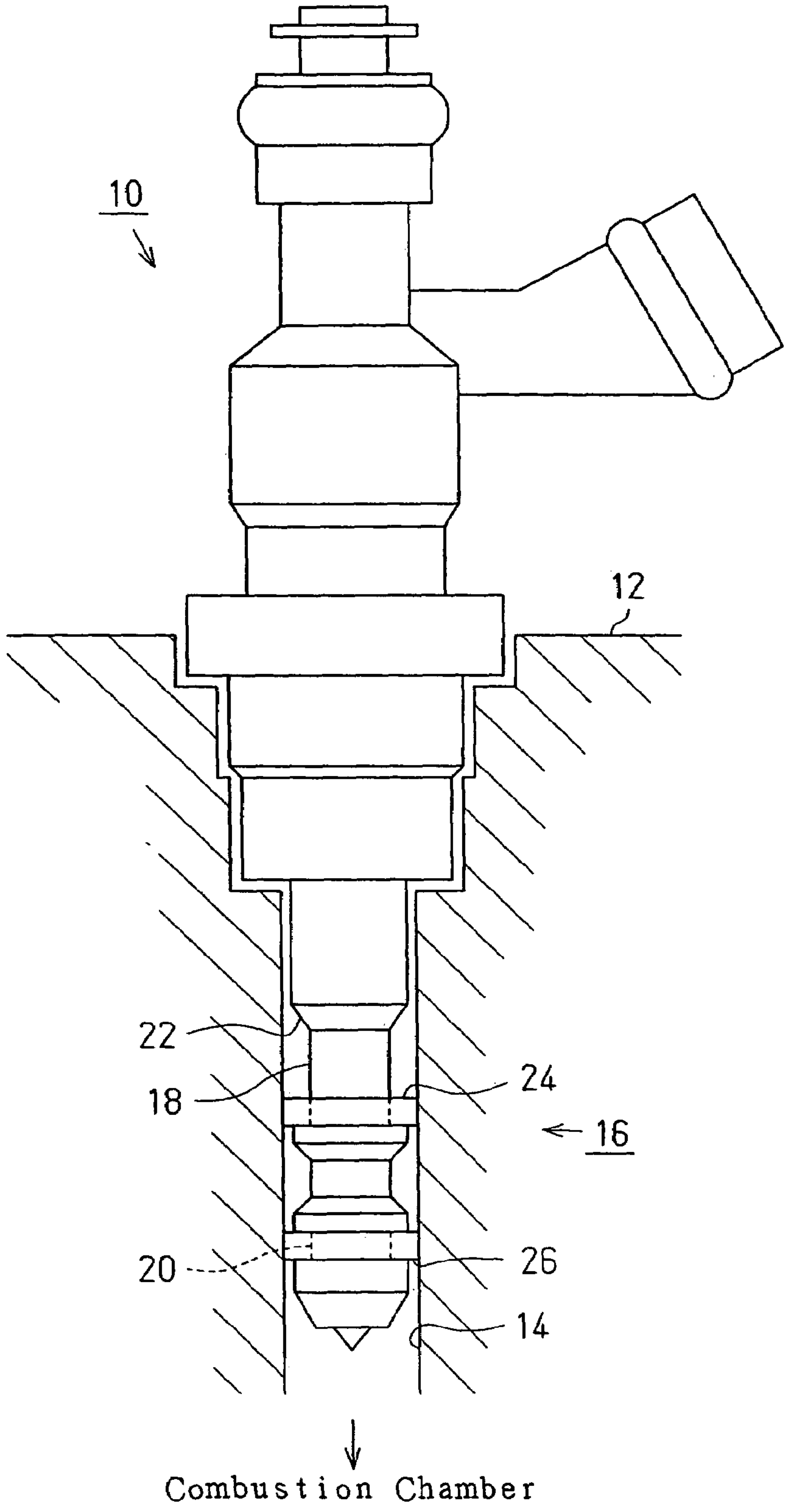
FIG. 11 is a partial cross-sectional view showing an injector and the vicinity thereof to which an installation procedure and a correction jig for a combustion gas seal according to a second embodiment of the present invention is applied.

FIG. 11 illustrates the injector 10 of the second embodiment and the vicinity around the injector 10.

In the second embodiment, the nozzle portion 16 of the injector 10 includes a first installation groove 18 and a second installation groove 20. The installation grooves 18, 20 each have an annular shape and are defined along the entire circumference of the nozzle portion 16. The second installation groove 20 is located closer to the nozzle distal end than the first installation groove 18.

An annular combustion gas seal 24 is installed in the first installation groove 18 of the injector 10. Likewise, an annular combustion gas seal 26 is installed in the second installation groove 20. Each of the gas seals 24, 26 seals an annular space between the injector installation recess 14 and the nozzle portion 16.

The procedure for installing the gas seals 24, 26 in the injector 10 will hereafter be described.

Figure 12:
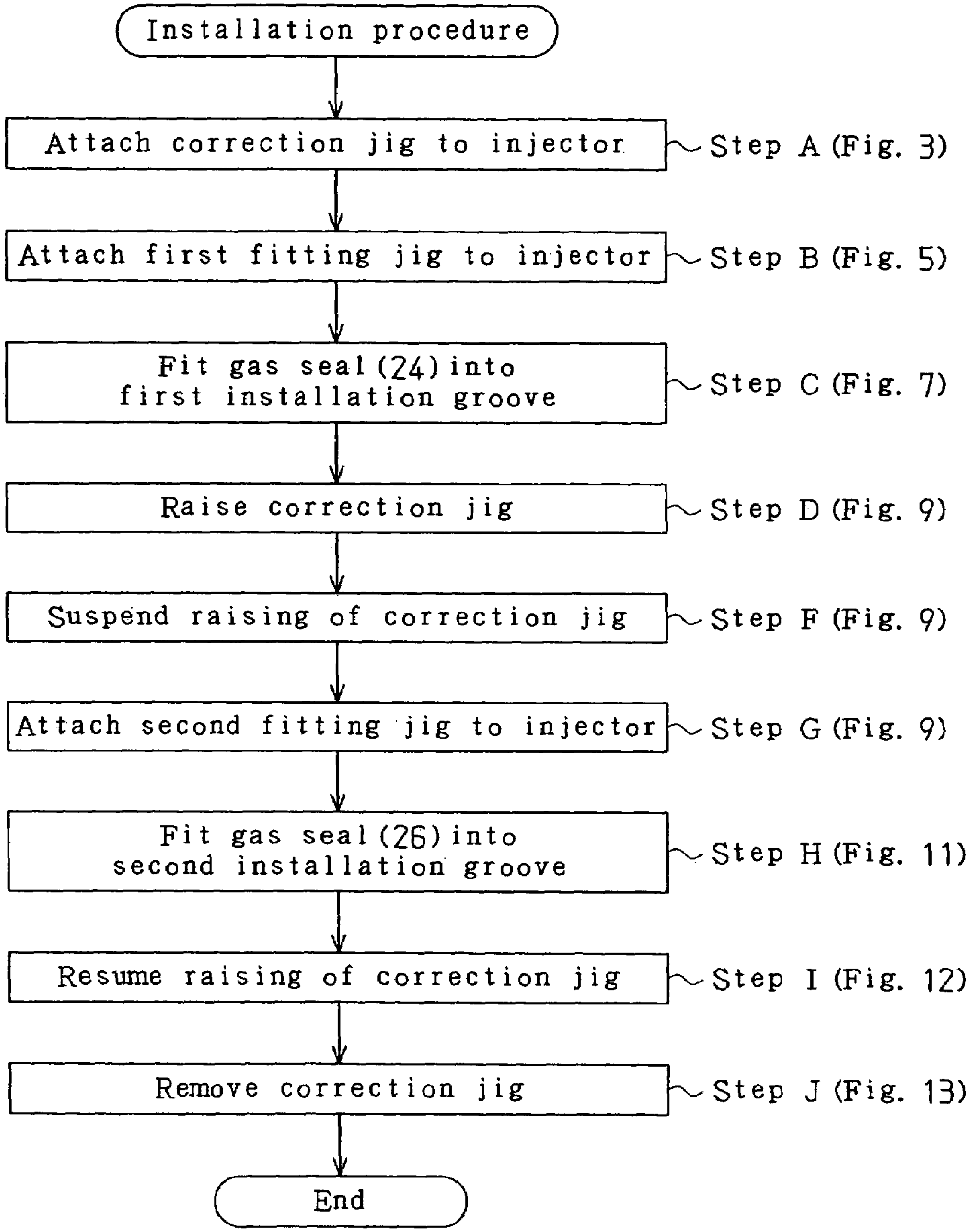
FIG. 12 is a flowchart illustrating an installation procedure for the gas seal of the second embodiment.
Figure 13:
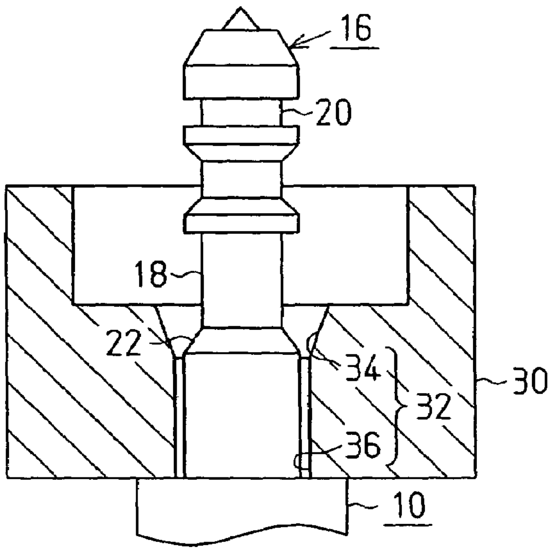
FIG. 13 is a partial cross-sectional view corresponding to an installation step for the gas seal of the second embodiment.
Figure 14:
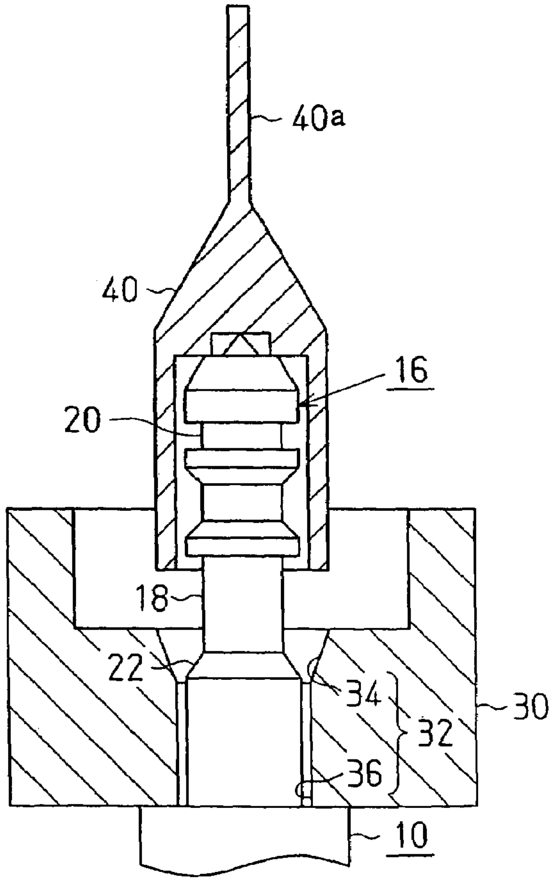
FIG. 14 is a partial cross-sectional view corresponding to an installation step for the gas seal of the second embodiment.
Figure 15:
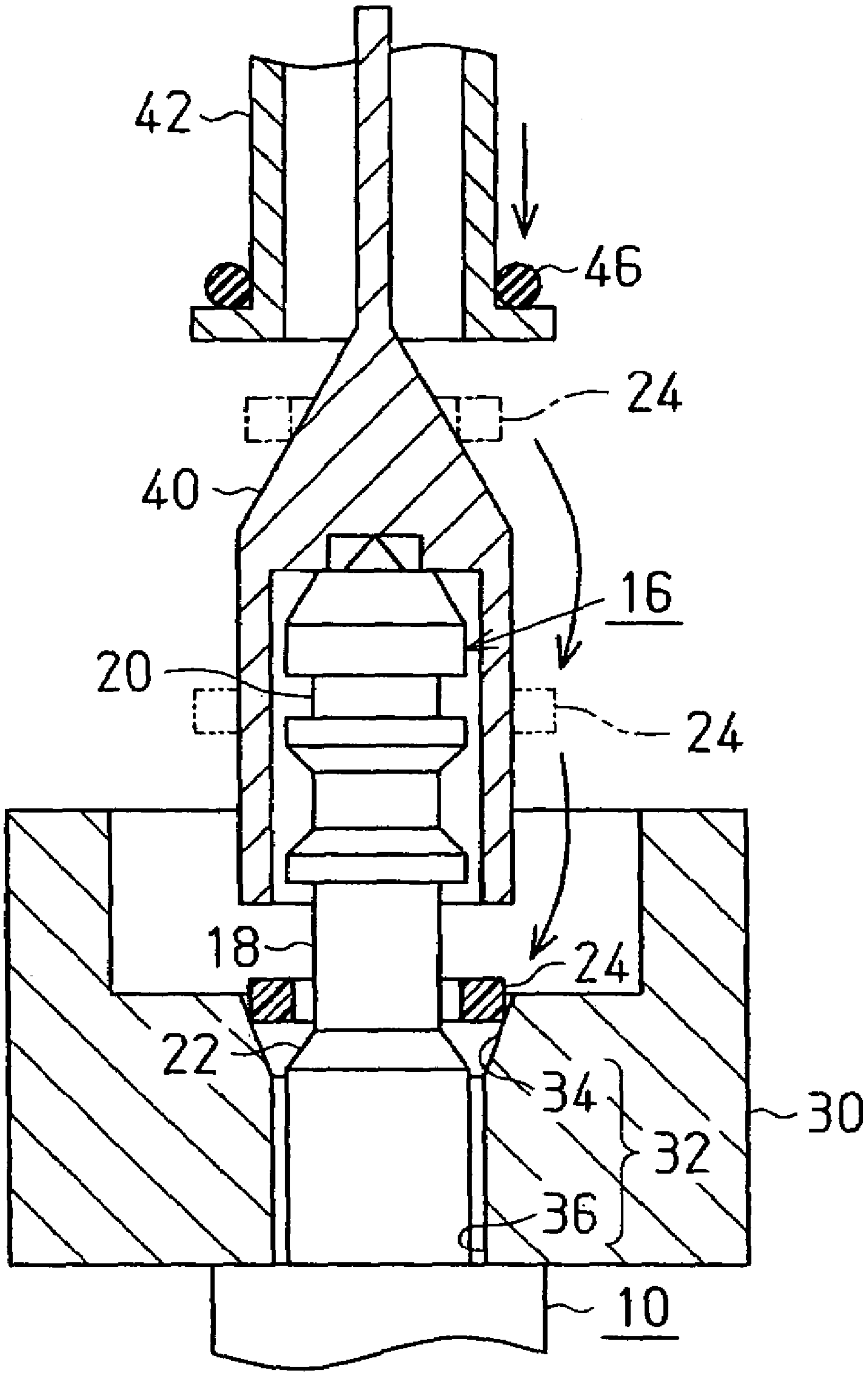
FIG. 15 is a partial cross-sectional view corresponding to an installation step for the gas seal of the second embodiment.

The procedure is performed on the injector 10 supported with the nozzle portion 16 facing upward, in accordance with steps A to D and F to J of FIG. 12.

With reference to FIGS. 13 to 20, steps A to D and F to J will be explained. Since steps A to D are the same as those of the first embodiment, detailed explanation thereof is omitted.

Figure 16:
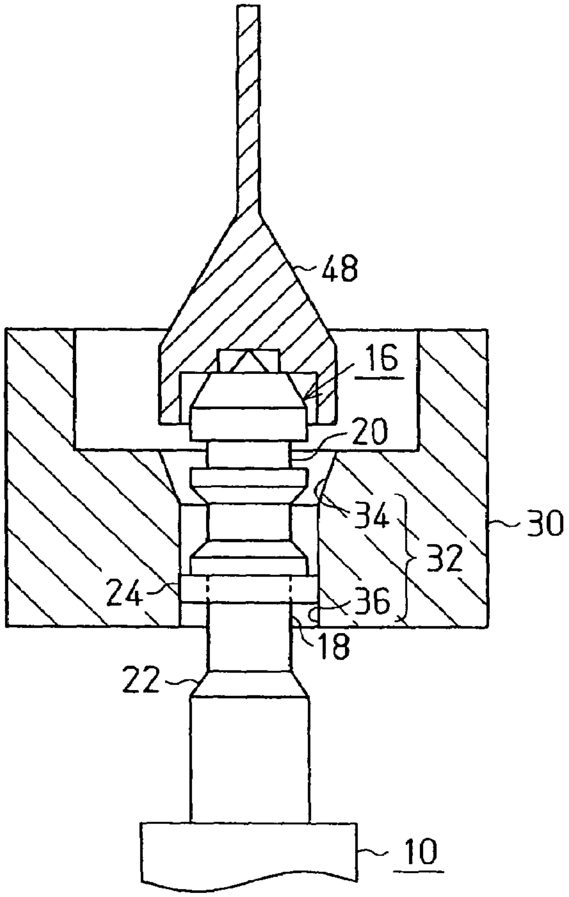
FIG. 16 is a partial cross-sectional view corresponding to an installation step for the gas seal of the second embodiment.

<Step F: FIG. 16>

When the correction jig 30 is operated such that the outer diameter of the gas seal 24 is corrected by the cylindrical surface 36 of the correction jig 30, the movement of the correction jig 30 is suspended.

In this manner, sufficient time is ensured for the correction of the outer diameter of the gas seal 24. The correction is thus optimally completed.

<Step G: FIG. 16>

While the movement of the correction jig 30 is suspended, a second fitting jig 48 is attached to a portion of the injector 10 corresponding to the nozzle distal end.

Figure 17:
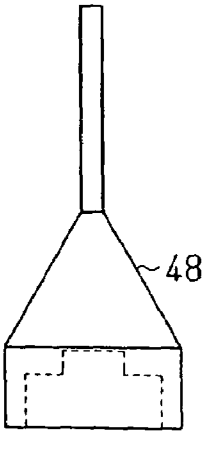
FIG. 17 is a side view showing a fitting jig for the second embodiment.

The second fitting jig 48 is configured essentially identical to the first fitting jig 40 (see FIG. 6), referring to FIG. 17. The second fitting jig 48 is used for guiding the gas seal 26 to the second installation groove 20 before the gas seal 26 is fitted to the second installation groove 20. Accordingly, as compared to the first fitting jig 40 of FIG. 6, the axial dimension of the lower, cylindrical portion of the second fitting jig 48 is relatively small.

Figure 18:
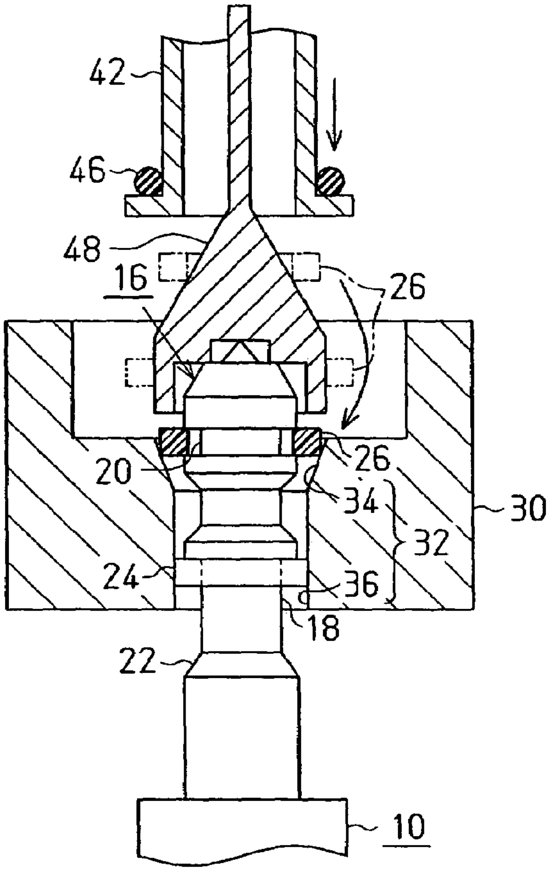
FIG. 18 is a partial cross-sectional view corresponding to an installation step for the gas seal of the second embodiment.

<Step H: FIG. 18>

Referring to FIG. 18, using the second fitting jig 48 and the pressing jig 42, the gas seal 26 is pressed down and radially expanded until the gas seal 26 reaches the second installation groove 20.

Once reaching the second installation groove 20, the gas seal 26 falls downward while restoring to its original diameter due to its elastic shape-restoring force, like the gas seal 24. The gas seal 26 is then received by the tapered surface 34 of the correction jig 30. In the second embodiment, the axial dimension and shape of the inner circumferential surface 32 (a correction surface) of the correction jig 30 including the tapered surface 34 are set such that the gas seal 26 is received by the tapered surface 34 at a position corresponding to the second installation groove 20 when the gas seal 26 reaches the second installation groove 20. Further, in the illustrated embodiment, step H corresponds to a third step for fitting the gas seal 26 to the second installation groove 20 from the side corresponding to the nozzle distal end and positioning the gas seal 26 on the second installation groove 20 using a portion of the correction jig 30 corresponding to the nozzle distal end, when the correction of the second step (step D) is performed.

Figure 19:
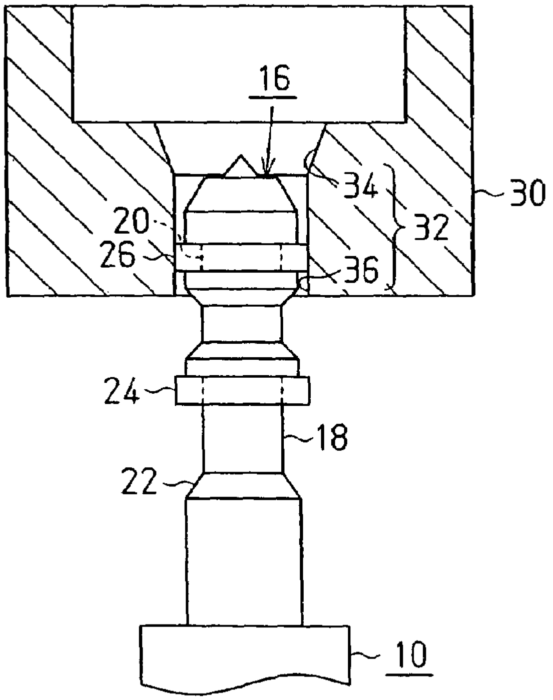
FIG. 19 is a partial cross-sectional view corresponding to an installation step for the gas seal of the second embodiment.

<Step I: FIG. 19>

With reference to FIG. 19, the movement of the correcting jig 30 is resumed and the correction jig 30 is raised to a further upper position.

Accordingly, the outer diameter of the gas seal 26 is corrected by the inner circumferential surface 32 of the correction jig 30. In the second embodiment, step I corresponds to a fourth step for correcting the outer diameter of the gas seal 26 installed in the second installation groove 20 by further moving the correction jig 30 toward the nozzle distal end relative to the injector 10.

Figure 20:
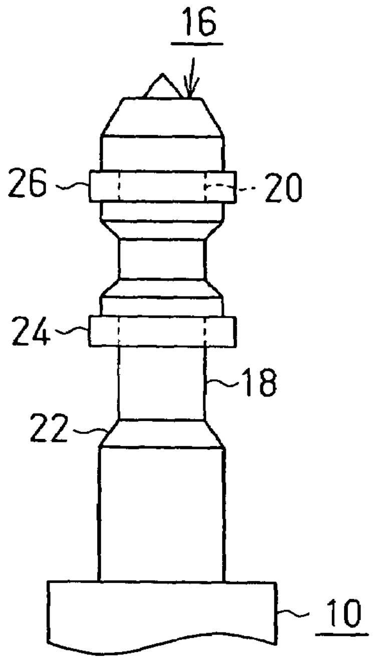
FIG. 20 is a side view showing the structure of the injector in which the gas seal is installed in accordance with the second embodiment.
Figure 21:
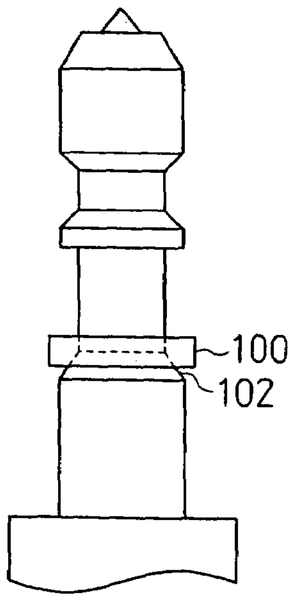
FIG. 21 is a side view showing a conventional combustion gas seal in a state fitted to the injector.

<Step J: FIG. 20>

The correction jig 30 is further raised and removed from the injector 10. As a result, as illustrated in FIG. 20, the installation of the gas seals 24, 26 in the corresponding installing grooves 18, 20 is completed.

The second embodiment has the following advantages.

(1) The outer diameters of the gas seals 24, 26, which are installed in the corresponding installation grooves 18, 20, are corrected at one time by moving the correction jig 30 toward the nozzle distal end relative to the injector 10 for a single cycle. Thus, as compared to the case in which the outer diameter of the gas seal 24 is corrected separately from the outer diameter of the gas seal 26, the correction procedure of the second embodiment is simplified. Further, while the gas seal 24 fitted in the first installation groove 18 is subjected to correction, the gas seal 26 is moved to the second installation groove 20 and positioned with respect to the installation groove 20. This shortens the total time needed for installation. Accordingly, the gas seals 24, 26 are quickly installed in the injector 10 by a relatively simple procedure.

(2) With the movement of the correction jig 30 suspended, the gas seal 26 is fitted to the second installation groove 20. The gas seal 26 is thus positioned with respect to the second installation groove 20 without conducting a complicated step such as setting the movement speed of the gas seal 26 or that of the correction jig 30. As a result, the gas seal 26 is installed in the injector 10 relatively easily and with improved accuracy.

(3) The dimensions and shape of the inner circumferential surface 32 are set such that the gas seal 26 is received at a position corresponding to the second installation groove 20 while the gas seal 24 fitted to the first installation groove 18 is subjected to correction. Thus, various steps including correction of the outer diameter of the gas seal 24, positioning of the gas seal 26, and correction of the outer diameter of the gas seal 26 are completed as a single continuous procedure corresponding to a single cycle of movement of the correction jig 30 toward the nozzle distal end relative to the injector 10. As a result, the gas seals 24, 26 are installed further quickly.

(4) The tapered surface 34 is formed in the portion of the inner circumferential surface 32 corresponding to the nozzle distal end of the injector 10. Thus, when the gas seal 24 is fitted to the first installation groove 18, the gas seal 24 is moved toward the nozzle distal end as guided by the tapered surface 34. Further, when the gas seal 26 reaches the second installation groove 20, the gas seal 26 is received by the tapered surface 34. In other words, after the gas seal 24 is received by the tapered surface 34, the gas seal 24 is quickly moved toward the nozzle distal end with the outer diameter of the gas seal 24 corrected by the tapered surface 34. Also, once the gas seal 26 is received by the tapered surface 34 in the second installation groove 20, the correction of the outer diameter of the gas seal 26 is smoothly started. Accordingly, the two gas seals 24, 26 are installed in the injector 10 further quickly.

(5) The taper angle a of the tapered surface 34 of the correction jig 30 is set to 10 degrees. It is thus possible to correct the outer diameter of each of the gas seals 24, 26 appropriately.

The illustrated embodiments may be modified as follows.

In the illustrated embodiments, the correction jig 30 is raised for moving the gas seal 24, correcting the outer diameter of the gas seal 24, positioning the gas seal 26, and correcting the outer diameter of the gas seal 26. However, instead of or in addition to this, the injector 10 may be lowered. That is, as long as the correction jig 30 is moved from the side corresponding to the body of the injector 10 to the nozzle distal end, the injector 10 and the correction jig 30 may be moved in any suitable direction.

In the illustrated embodiments, when the gas seals 24, 26 are installed in the injector 10, the injector 10 is supported such that the nozzle distal end faces upward. However, the orientation of the injector 10 may be modified without affecting the steps of the installation procedure for the gas seals 24, 26, including attachment of the first or second fitting jig 40, 48, and fitting of the gas seals 24, 26.

In the second embodiment, when the outer diameter of the gas seal 24 fitted to the first installation groove 18 is corrected, movement of the correction jig 30 is suspended. However, the correction jig 30 may be moved continuously as long as the outer diameter of the gas seal 24 is corrected appropriately. In this case, the movement speed of the correction jig 30, the fit timing of the gas seal 26, and the movement speed of the gas seal 26 may be adjusted such that the gas seal 26 is reliably installed in the second installation groove 20.

The taper angle a of the tapered surface 34 of the correction jig 30 may be adjusted as needed, as long as the angle $\alpha$ is not less than 10 degrees but not more than 20 degrees.

The axial dimension or shape of the inner circumferential surface 32 of the correction jig 30 may be modified as needed, as long as correction of the gas seal 24, as well as positioning and correction of the gas seal 26, is performed optimally.

In the first embodiment, the gas seal 24 is received by the correction jig 30 when reaching the installation groove 18. However, a member for receiving the gas seal 24 may be provided separately from the correction jig 30. More specifically, the separate receiving member is attached to the injector 10 for receiving the gas seal 24 in the installation groove 18. In this case, like the first embodiment, by arranging the receiving member such that the portion receiving the gas seal 24 is located closer to the nozzle distal end than the slanted surface 22 of the installation groove 18, the gas seal 24 is prevented from being interfered with the slanted surface 22.

In the second embodiment, the gas seals 24, 26 are received by the tapered surface 34 of the correction jig 30, once reaching the corresponding installation grooves 18, 20. However, the gas seals 24, 26 may be received by the upper surface of the correction jig 30. That is, the gas seals 24, 26 may be received by any suitable portion of the correction jig 30.

The installation procedure and the correction jig 30 of the gas seal 24 according to the present invention are not restricted to use for the injector 10, which includes the slanted surface 22 in the installation groove 18. That is, the present invention may be applied to an installation procedure and a correction jig for a gas seal for an injector including an installation groove with a non-uniform diameter.

The present examples and embodiments are to be considered as illustrative and not restrictive and the invention is not to be limited to the details given herein, but may be modified within the scope and equivalence of the appended claims.

The invention claimed is:

1. A method for installing a resin combustion gas seal to an injector fitted to an installation recess, wherein the injector has a body and a nozzle portion extending from the body, the nozzle portion having an annular installation groove in which the combustion gas seal is installed, the installation groove having an increased diameter portion in a section closer to the body, wherein the combustion gas seal seals an annular space defined between the nozzle portion and an inner surface of the installation recess, the method comprising:

a first step wherein, with the combustion gas seal being prevented from interfering with the increased diameter portion, the nozzle portion is caused to pass through the combustion gas seal from a distal end of the nozzle portion, thereby arranging the combustion gas seal at the installation groove; and a second step wherein, after arranging the combustion gas seal at the installation groove, relative movement is produced between the injector and a correction jig such that the correction jig approaches the distal end of the nozzle portion from a side of the body, thereby correcting an outer diameter of the combustion gas seal.

2. The method according to claim 1, wherein the first step is performed in a state where the injector is supported such that the nozzle portion faces upward.

3. The method according to claim 1, further comprising a step for arranging the correction jig in a section closer to the body than the installation groove prior to the first step, wherein, in the first step, the correction jig receives the combustion gas seal so that the combustion gas seal is prevented from interfering with the increased diameter portion.

4. The method according to claim 1, wherein the first step includes moving the combustion gas seal relative to a fitting jig attached to the nozzle portion from the distal end of the nozzle portion to the installation groove at a speed equal to or faster than 90 mm/s.

5. The method according to claim 1, wherein the first step includes:

attaching a cylindrical fitting jig to the nozzle portion; and moving the combustion gas seal from the distal end of the nozzle portion to the installation groove at a speed equal to or faster than 90 mm/s, while radially expanding the combustion gas seal with the fitting jig.

6. The method according to claim 1, wherein the installation groove is a first installation groove, and the combustion gas seal is a first combustion gas seal, wherein the nozzle portion further has a second installation groove that is closer to the distal end of the nozzle portion than the first installation groove, and wherein a second combustion gas seal is installed in the second installation groove, the method further comprising:

a third step performed in the second step, wherein, in the third step, the nozzle portion is caused to pass through the second combustion gas seal from the distal end, thereby arranging the second combustion gas seal at the second installation groove, and the second combustion gas seal is positioned with respect to the second installation groove with the correction jig; and a fourth step wherein, after arranging the second combustion gas seal at the second installation groove, the relative movement of the injector and the correction jig is further produced such that the correction jig approaches the distal end of the nozzle portion, thereby correcting the outer diameter of the second combustion gas seal.

7. The method according to claim 6, wherein, when positioning the second combustion gas seal with respect to the second installation groove, the relative movement of the injector and the correction jig is temporarily stopped.

8. A method for installing first and second resin combustion gas seals to an injector fitted to an installation recess, wherein the injector has a body and a nozzle portion extending from the body, the nozzle portion having first and second annular installation grooves in which the first and second combustion gas seals are installed, respectively, the second installation groove being closer to the distal end of the nozzle portion than the first installation groove, and wherein the first and second combustion gas seals seal an annular space defined between the nozzle portion and an inner surface of the installation recess, the method comprising:

a first step wherein the nozzle portion is caused to pass through the first combustion gas seal from a distal end of the nozzle portion, thereby arranging the first combustion gas seal at the first installation groove;

a second step wherein, after arranging the first combustion gas seal at the first installation groove, relative movement is produced between the injector and a correction jig such that the correction jig approaches the distal end of the nozzle portion from a side of the body, thereby correcting an outer diameter of the first combustion gas seal;

a third step performed in the second step, wherein, in the third step, the nozzle portion is caused to pass through the second combustion gas seal from the distal end, thereby arranging the second combustion gas seal at the second installation groove, and the second combustion gas seal is positioned with respect to the second installation groove with the correction jig; and a fourth step wherein, after arranging the second combustion gas seal at the second installation groove, the relative movement of the injector and the correction jig is further produced such that the correction jig approaches the distal end of the nozzle portion, thereby correcting the outer diameter of the second combustion gas seal.

9. The method according to claim 8, wherein, when positioning the second combustion gas seal with respect to the second installation groove, the relative movement of the injector and the correction jig is temporarily stopped.

10. A correction jig used when installing a resin combustion gas seal to an injector fitted to an installation recess, wherein the injector has a body and a nozzle portion extending from the body, the nozzle portion having an annular installation groove in which the combustion gas seal is installed, the installation groove having an increased diameter portion in a section closer to the body, wherein the combustion gas seal seals an annular space defined between the nozzle portion and an inner surface of the installation recess, the correction jig comprising:

a cylindrical surface that defines an insertion hole into which the injector is inserted, wherein, when relative movement is produced between the injector and the correction jig such that the combustion gas seal arranged at the installation groove passes by the cylindrical surface, the cylindrical surface corrects the outer diameter of the combustion gas seal, which has been radially expanded when the combustion gas seal is installed in the installation groove;

a support portion, wherein, in a state where the injector is inserted into the insertion hole, the support portion contacts the injector to determine a position of the correction jig along an axial direction relative to the injector; and a receiving portion, wherein, when the nozzle portion is caused to pass through the combustion gas seal from a distal end of the nozzle portion to arrange the combustion gas seal at the installation groove, the receiving portion receives the combustion gas seal, and wherein the length from the support portion to the receiving portion is determined such that, in a state where the support portion contacts the injector, the receiving portion is closer to the distal end of the nozzle portion than the increased diameter portion.

11. The correction jig according to claim 10, wherein the receiving portion includes a tapered surface.

12. The correction jig according to claim 11, wherein the tapered surface is continuous with the cylindrical surface.

13. The correction jig according to claim 11, wherein the taper angle of the tapered surface is no less than 10 degrees and less than 20 degrees.

14. The correction jig according to claim 11, wherein the taper angle of the tapered surface is 10 degrees.

15. A correction jig used when installing a first and second resin combustion gas seals to an injector fitted to an installation recess, wherein the injector has a body and a nozzle portion extending from the body, the nozzle portion having first and second annular installation grooves in which the first and second combustion gas seals are installed, respectively, the second installation groove being closer to the distal end of the nozzle portion than the first installation groove, and wherein the first and second combustion gas seals seal an annular space defined between the nozzle portion and an inner surface of the installation recess, the correction jig comprising:

a cylindrical surface that defines an insertion hole into which the injector is inserted, wherein, when relative movement is produced between the injector and the correction jig such that each combustion gas seal arranged at the corresponding installation groove passes by the cylindrical surface, the cylindrical surface corrects the outer diameter of each combustion gas seal, which has been radially expanded when the combustion gas seal is installed in the corresponding installation groove; and a receiving portion, wherein, when the nozzle portion is caused to pass through the second combustion gas seal from a distal end of the nozzle portion to arrange the second combustion gas seal at the second installation groove, the receiving portion receives the second combustion gas seal, and wherein the cylindrical surface and the receiving portion are formed such that, when the cylindrical surface is correcting the outer diameter of the first combustion gas seal, the receiving portion receives the second combustion gas seal at a position corresponding to the second installation groove.

16. The correction jig according to claim 15, wherein the receiving portion includes a tapered surface.

17. The correction jig according to claim 16, wherein the tapered surface is continuous with the cylindrical surface.

18. The correction jig according to claim 16, wherein the taper angle of the tapered surface is no less than 10 degrees and less than 20 degrees.

19. The correction jig according to claim 16, wherein the taper angle of the tapered surface is 10 degrees.

* * * * *